(12) United States Patent
Cheong et al.

(10) Patent No.: US 7,079,455 B2
(45) Date of Patent: Jul. 18, 2006

(54) OPTICAL READING AND WRITING SYSTEM

(75) Inventors: Young-min Cheong, Seoul (KR); Cheol-sung Yeon, Suwon (KR); Ho-cheol Lee, Seoul (KR); Dong-seob Jang, Seoul (KR); Gyu-chan Jun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 939 days.

(21) Appl. No.: 09/776,706

(22) Filed: Feb. 6, 2001

(65) Prior Publication Data

US 2001/0055264 A1 Dec. 27, 2001

(30) Foreign Application Priority Data

Apr. 3, 2000 (KR) ............................... 2000-17349

(51) Int. Cl.
*G11B 7/00* (2006.01)
(52) U.S. Cl. ................................................... 369/44.19
(58) Field of Classification Search ............ 369/44.13, 369/44.14, 44.15, 44.16, 44.18, 44.21, 44.22, 369/44.17, 44.19, 13.32, 13.33, 114
See application file for complete search history.

(56) References Cited

U.S. PATENT DOCUMENTS

| 5,216,643 | A | * | 6/1993 | Berg ........................ 369/13.32 |
| 5,218,582 | A | | 6/1993 | Marchant |
| 5,351,229 | A | * | 9/1994 | Brezoczky et al. .......... 369/113 |
| 5,432,763 | A | * | 7/1995 | Campbell et al. ......... 369/44.14 |
| 5,615,203 | A | * | 3/1997 | Fukakusa .................. 369/44.12 |
| 5,631,893 | A | * | 5/1997 | Kang et al. ............... 369/44.15 |
| 5,793,407 | A | * | 8/1998 | Park et al. ................... 359/566 |
| 5,828,482 | A | * | 10/1998 | Jain ....................... 369/112.24 |
| 6,288,985 | B1 | * | 9/2001 | Jordache et al. ......... 369/44.14 |

FOREIGN PATENT DOCUMENTS

| CN | 1232250 | 10/1999 |
| JP | 1-317233 | 12/1989 |
| JP | 5-250708 | 9/1993 |

\* cited by examiner

Primary Examiner—Thang V. Tran
(74) Attorney, Agent, or Firm—Stein, McEwen & Bui, LLP

(57) ABSTRACT

An optical reading and writing system including a base; an optical disk rotatably mounted on the base; an optical pickup including an objective lens, focusing a light beam to form a light spot on a recording surface of the optical disk; an actuator arm mounted on the base such that the actuator arm can pivot in the radial direction of the optical disk by a voice coil motor; a load beam supported by the actuator arm, and capable of moving slightly up and down and in the radial direction of the optical disk by an external force; a flexure attached to the load beam, supporting a slider to enable the slider to contact the recording surface; and a driving unit mounted on free ends of the actuator arm and the load beam, providing a driving force in the radial direction to the free end of the load beam.

29 Claims, 5 Drawing Sheets

OPTICAL READING AND WRITING SYSTEM

CROSS-REFERENCE TO RELATED APPLICATIONS

This application claims the benefit of Korean Patent Application No. 00-17349, filed Apr. 3, 2000, in the Korean Patent Office, the disclosure of which is incorporated herein by reference.

BACKGROUND OF THE INVENTION

1. Field of the Invention

The present invention relates to an optical system for optically reading information from and writing information onto an optical recording medium.

2. Description of the Related Art

Optical reading and writing systems such as a near field optical disk drive read information from and write information onto an optical recording medium, such as an optical disk, using an optical pickup. An optical reading and writing system includes an actuator driving over an optical disk while being supported by a spindle motor. An example of an optical reading and writing system employing such an actuator is shown in FIGS. 1 and 2.

Referring to FIGS. 1 and 2, an actuator 2 for driving an actuator arm 4 is mounted to a base 1 enabling the actuator 2 to pivot relative to the base 1. An optical disk 7 is rotatably mounted onto a spindle motor 6, and an optical pickup is installed on the actuator 2 to be capable of reading information from and writing information onto the optical disk 7 by focusing a light beam L onto the optical disk 7. The first portion of the optical pickup is formed at a mounter 3, which is the pivot portion of the actuator 2. The optical pickup includes a light source 10 for emitting light, an objective lens 11 near the end of a slider 9, and a photodetector 13 installed in the mounter 3. A flexible load beam 8 is attached to the actuator arm 4 to be separated a predetermined distance from the lower side of an end of the arm 4. The slider 9 is installed at the free end of the load beam 8. The slider 9 levitates over the optical disk 7 by hydrodynamics during rotation of the optical disk 7, thereby forming a so-called near field.

During a reading or writing operation, the actuator arm 4 pivots by the driving force of a voice coil motor 5 in the radial direction A of the optical disk 7. Here, the light beam L emitted from the light source 10 is reflected by a reflection member 15 mounted at the end of the actuator arm 4, and incident into the objective lens 11. The objective lens 11 focuses the incident beam L to form a light spot on the recording surface of the optical disk 7. In turn, the light beam is reflected from the recording surface of the optical disk 7 and passes through the objective lens 11 and the reflection member 15. An optical path changing member 17 arranged on the optical path reflects the light reflected by the reflection member 15 back toward the photodetector 13. The photodetector 13 receives the incident light and detects information.

In the structure having the above configuration, however, after the light beam emitted from the light source 10 is incident onto the recording surface of the optical disk 7, the light beam reflected from the recording surface is detected by the photodetector 13 via the same optical path but in the opposite direction. As the light beam travels along the optical path, the light beam contacts air, and there is some loss in the light beam. In particular, because the recording surface of the optical disk 7 is separated a predetermined distance apart from the photodetector 13, the optical loss increases with reduced reliability of information written to or read from the optical disk 7. Therefore, there is a need for a mechanism to help decrease optical loss and increase reliability of information written to and/or read from the optical disk 7.

There is an ever increasing need for optical disks having a high memory capacity, and the recording density of optical disks is increasing. For this reason, there is also a need for a new mechanism capable of precisely driving a slider to form a light spot on a desired spot of the recording surface. More precisely, the actuator 2 driven by a large driving force of the voice coil motor 5 has a limitation in accurately controlling the slider 9 fixed to the load beam 8 that is flexible.

SUMMARY OF THE INVENTION

Accordingly, it is an object of the present invention to provide an optical reading and writing system having an improved structure, which is able to accurately drive a slider with a small driving force, while at the same time minimizing optical loss.

It is another object of the present invention to provide an optical reading and writing system having an improved structure, which increases reliability of information written to or read from an optical disk, thus further minimizing optical loss.

Additional objects and advantages of the invention will be set forth in part in the description which follows, and in part, will be obvious from the description, or may be learned by practice of the invention.

To achieve the objective of the present invention, there is provided an optical reading and writing system comprising: a base; an optical disk rotatably mounted on the base; an optical pickup including an objective lens for focusing a light beam to form a light spot on a recording surface of the optical disk; an actuator arm mounted on the base such that the actuator can pivot in the radial direction of the optical disk by a voice coil motor; a load beam supported by the actuator arm, and capable of moving slightly up and down and in the radial direction of the optical disk by external force; a flexure attached to the load beam supporting a slider to enable the slider to contact the recording surface; and a driving unit mounted on free ends of the actuator arm and the load beam, providing a driving force in the radial direction to the free end of the load beam.

In another embodiment, there is provided an optical reading and writing system comprising: a base; an optical disk rotatably mounted on the base; an actuator assembly mounted on the base to be capable of pivoting in the radial direction of the optical disk, supporting a slider to enable the slider to contact a recording surface of the optical disk; and an optical pickup focusing a light beam to form a light spot on the recording surface of the optical disk, the optical pickup including: a light source emitting a light beam; an optical path changing unit arranged on the optical path between the light source and the recording surface, changing the traveling path of the incident beam; an objective lens mounted onto the slider, focusing the light beam from the optical path changing unit onto the recording surface; a photodetector receiving the light beam reflected from the recording surface and passed through the objective lens and the optical path changing unit; and at least one optical fiber connecting at least the light source and the optical path changing unit, transferring the condensed light beam to the optical path changing unit, wherein an optical loss between the light source and the optical path changing unit is suppressed.

BRIEF DESCRIPTION OF THE DRAWINGS

These and other objects and advantages of the present invention will become apparent and more readily appreciated from the following description of the preferred embodiments, taken in conjunction with the accompanying drawings in which.

DETAILED DESCRIPTION

Figure 1:
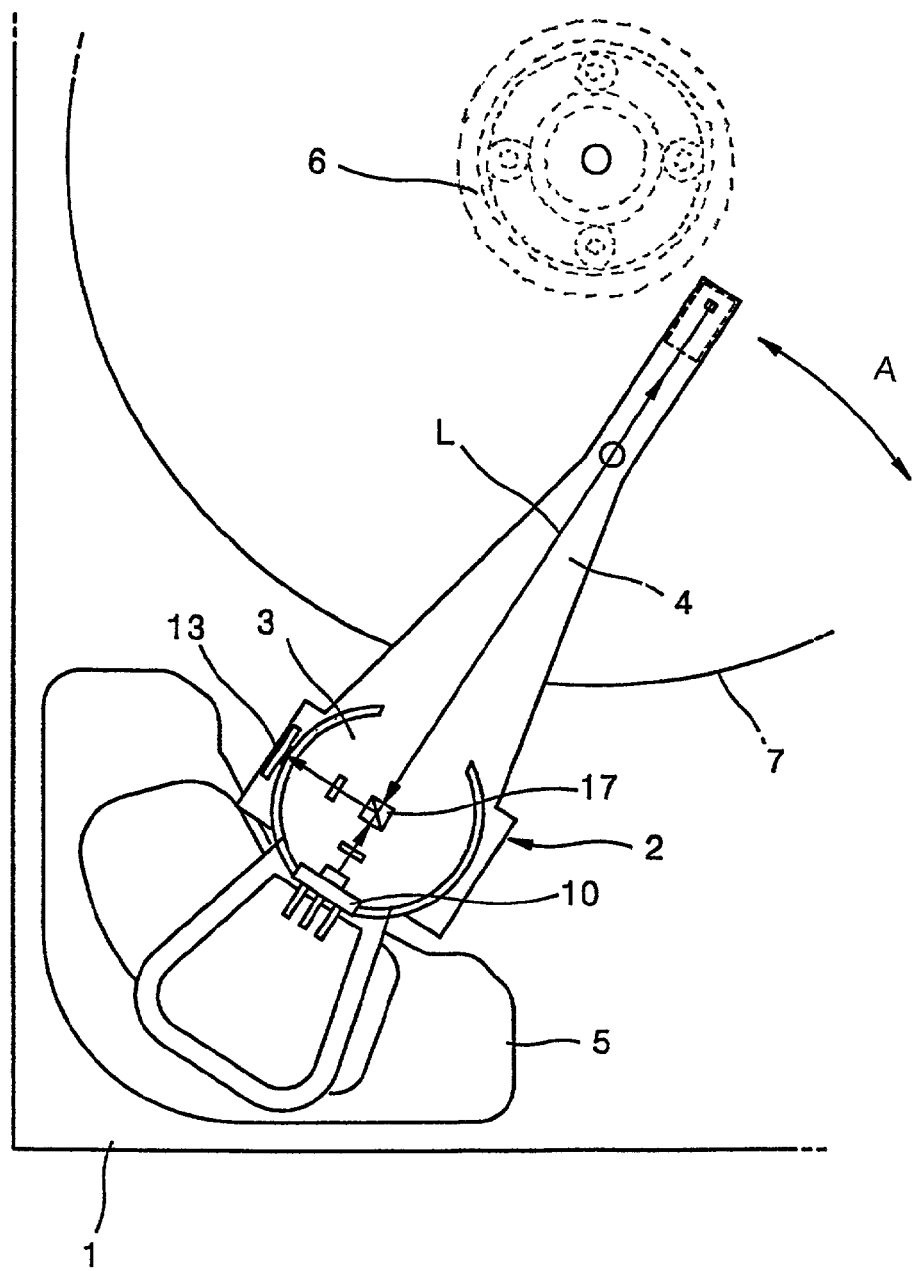
FIG. 1 is a schematic plan view of a common magneto-optical reading and writing system.
Figure 2:
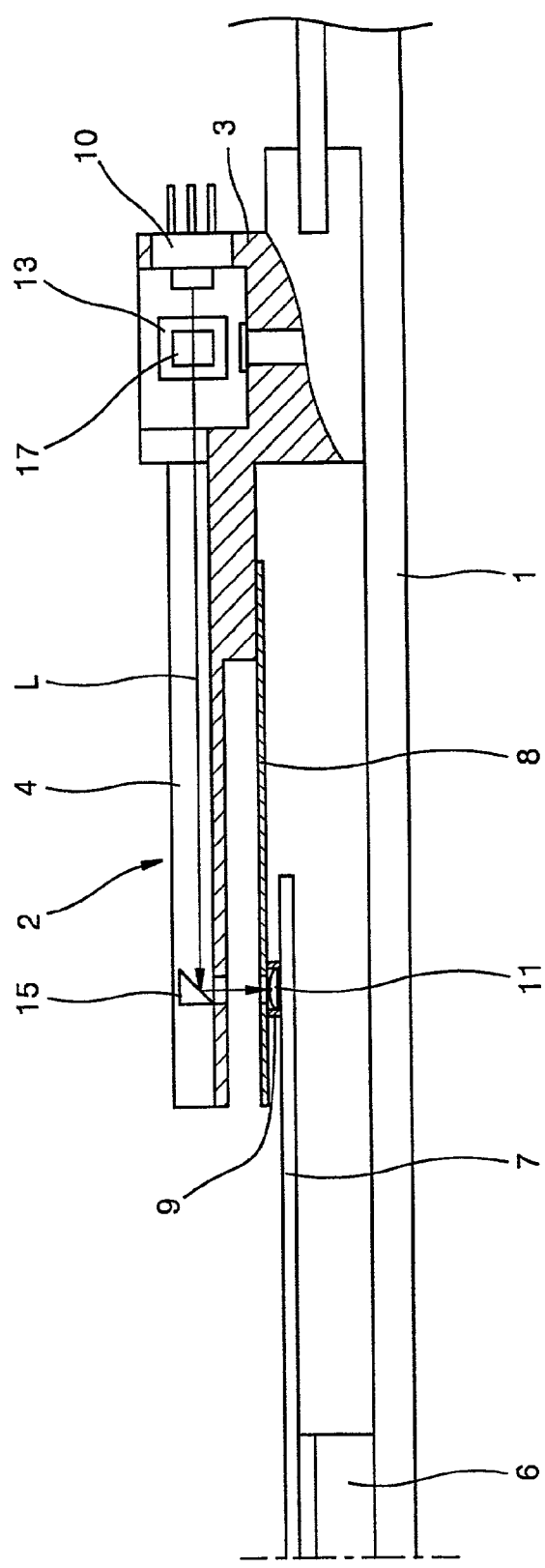
FIG. 2 is a partial sectional view of FIG. 1.

Reference will now be made in detail to the present preferred embodiments of the present invention, examples of which are illustrated in the accompanying drawings, wherein like reference numerals refer to like elements throughout.

Figure 3:
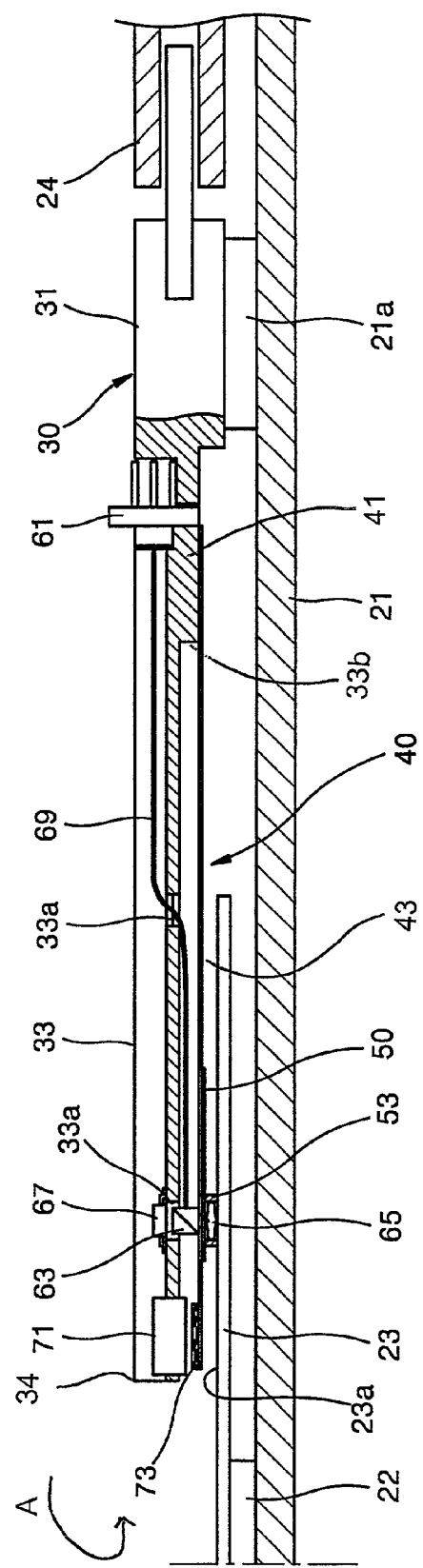
FIG. 3 is a sectional view of an optical reading and writing system according to an embodiment of the present invention.
Figure 4:
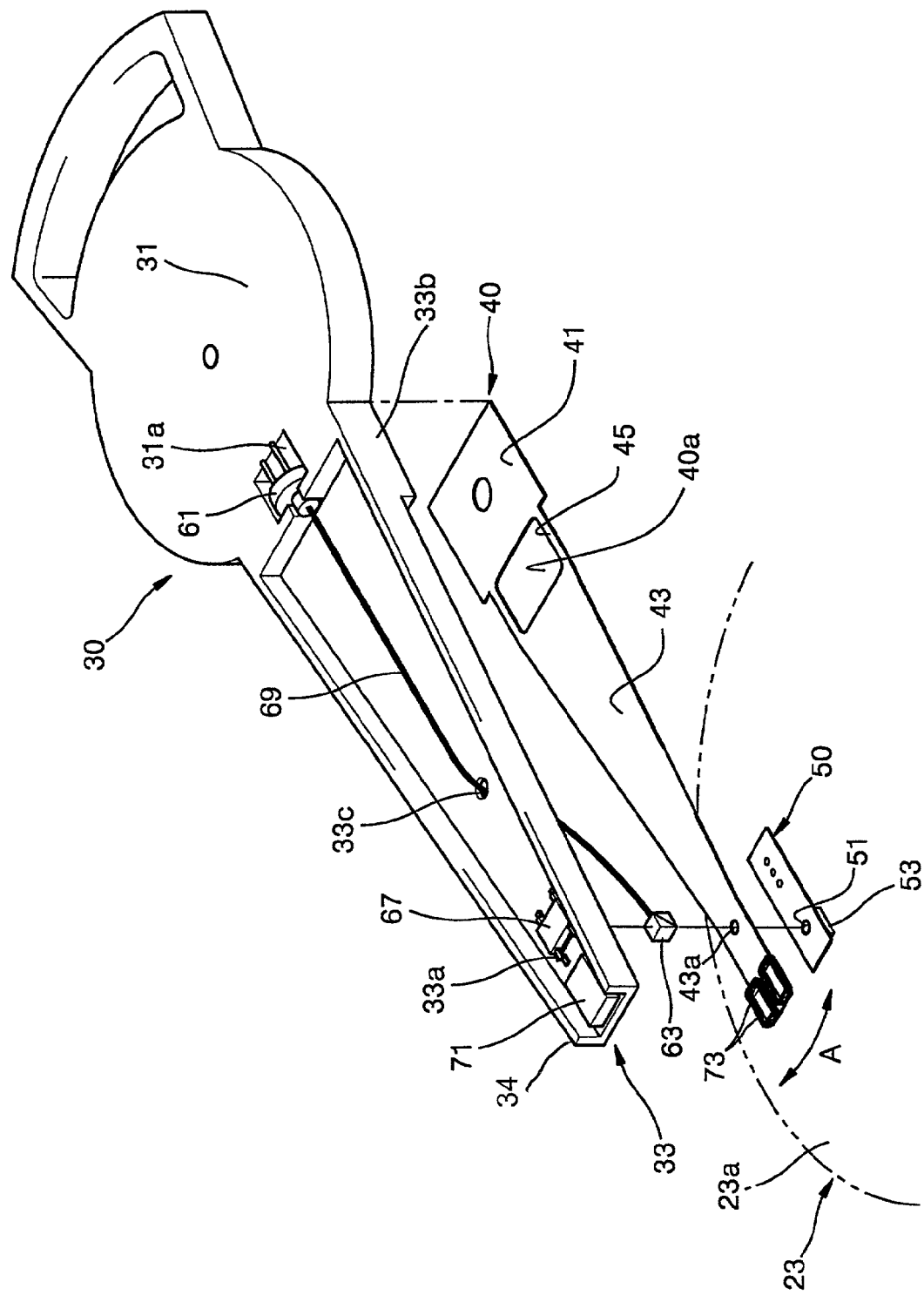
FIG. 4 is an exploded perspective view of the optical reading and writing system shown in FIG. 3.

Referring to FIGS. 3 and 4, an embodiment of the present invention illustrates a system for reading and/or writing information from and/or onto an optical disk 23. This embodiment of the present invention includes a base 21, an actuator assembly 30 mounted to be rotatable on the base 21, an optical pickup focusing a light spot on a recording surface 23a of the optical disk 23, and a driving unit.

The optical disk 23 is rotatably supported by a spindle motor 22 mounted on the base 21. Information can be recorded on one or both sides of the optical disk 23.

The actuator assembly 30 includes an actuator arm 33, a load beam 40 and a flexure 50. The actuator arm 33 extends from a mounter 31, which is mounted to enable the actuator arm 33 to pivot around a shaft 21a of the base 21. The mounter 31 has a recess 31a receiving the light source 61, which will be described later. The actuator arm 33 is movable in the radial direction A by a voice coil motor 24 mounted on the base 21.

The load beam 40 is attached to a coupling portion 33b of the actuator arm 33. The coupling portion 33b is stepped with respect to the bottom side of the actuator arm 33, which faces the recording surface 23a. The load beam 40 includes a fixed end 41, a free end 43 and a hinged portion 45. The fixed end 41 is fixed to the coupling portion 33b by a fixing means such as lead soldering. The free end 43 extending from the fixed end 41 is flexible to enable it to oscillate up and down, and in the radial direction A. The hinged portion 45 is between the fixed end 41 and the free end 43. In particular, the hinged portion 45 is constructed to have a pair of slim portions spaced a predetermined distance apart from each other, which connect the facing edges of the fixed end 41 and the free end 43. The hinged portion 45 corresponds to the rim of a hole 40a between the fixed end 41 and the free end 43. The hinged portion 45 is flexible in the radial direction A by external force. The free end 43 can move a small amount, relative to the fixed end 41, in the radial direction A. The fixed end 41, the free end 43 and the hinged portion 45 are combined to each other.

One end of a flexure 50 is fixed to the side of the load beam 40 that faces the recording surface 23a, and the other end of the flexure 50 is free. The free end of the flexure 50 holds a slider 53, which either contact the optical disk 23 under very low pressure or is positioned slightly apart from the optical disk 23 in a suspension state. The objective lens 65, which will later be described, is installed in the slider 53.

First light passing apertures 51 and 43a, as illustrated in FIG. 4, are formed in the flexure 50 and the free end 43 of the load beam 40, respectively, which correspond with the objective lens 65. Also, a second light passing aperture 33a is formed in the actuator arm 33 to correspond to the first light passing apertures 51 and 43a. An aperture 33c for receiving an optical fiber 69 is formed at a predetermined position of the actuator arm 33.

The optical pickup includes a light source 61, an optical path changing unit 63, the objective lens 65, a photodetector 67 and the optical fiber 69.

The light source 61 is seated inside the recess 31a, and generates a light beam. The optical path changing unit 63 is arranged on the optical path between the light source 61 and the recording surface 23a, and changes the traveling direction of the light beam on the optical path. Preferably, the optical path changing unit 63 is a beam splitter capable of selectively splitting a light beam. In particular, the optical path changing unit 63 is situated between the load beam 40 and the actuator arm 33, facing the objective lens 65 through the first light passing apertures 43a and 51. The optical path changing unit 63 is fixed to the free end 43 of the load beam 40 such that the optical fiber 69 can be accommodated through the hole 33c.

The objective lens 65, which is a well-known solid immersion mirror (SIM), focuses the light passed through the optical path changing unit 63 onto the recording surface 23a. The photodetector 67 is fitted into the second optical passing aperture 33a of the actuator arm 33, facing the optical path changing unit 63. The photodetector 67 receives the incident beam passed through the first light passing apertures 51 and 43a, and the second light passing aperture 33a, and detects information from the beam.

As previously described, the photodetector 67 is aligned vertically with the optical path changing unit 63 and the objective lens 65, so that the optical path between the photodetector 67 and the recording surface 23a is shortened, thereby minimizing optical loss through air.

One end of the optical fiber 69 is connected to the light source 61, and the other end of the optical fiber 69 is connected to the optical path changing unit 63 through the aperture 33c of the actuator arm 33. A light beam emitted from the light source 61 reaches the optical path changing unit 63 through the optical fiber 69, with minimal optical loss, compared to a conventional optical transmission through the air.

The driving unit, which provides a driving force to the free end 43 of the load beam 40, includes a magnet 71 and a pair of coils 73. The magnet 71 is mounted at the free end 34 of the actuator arm 33. The pair of coils 73 are mounted at the free end 43 of the load beam 40, facing the magnet 71. The coils 73 generate electromagnetic force with current applied from a predetermined power source (not shown).

Figure 5:
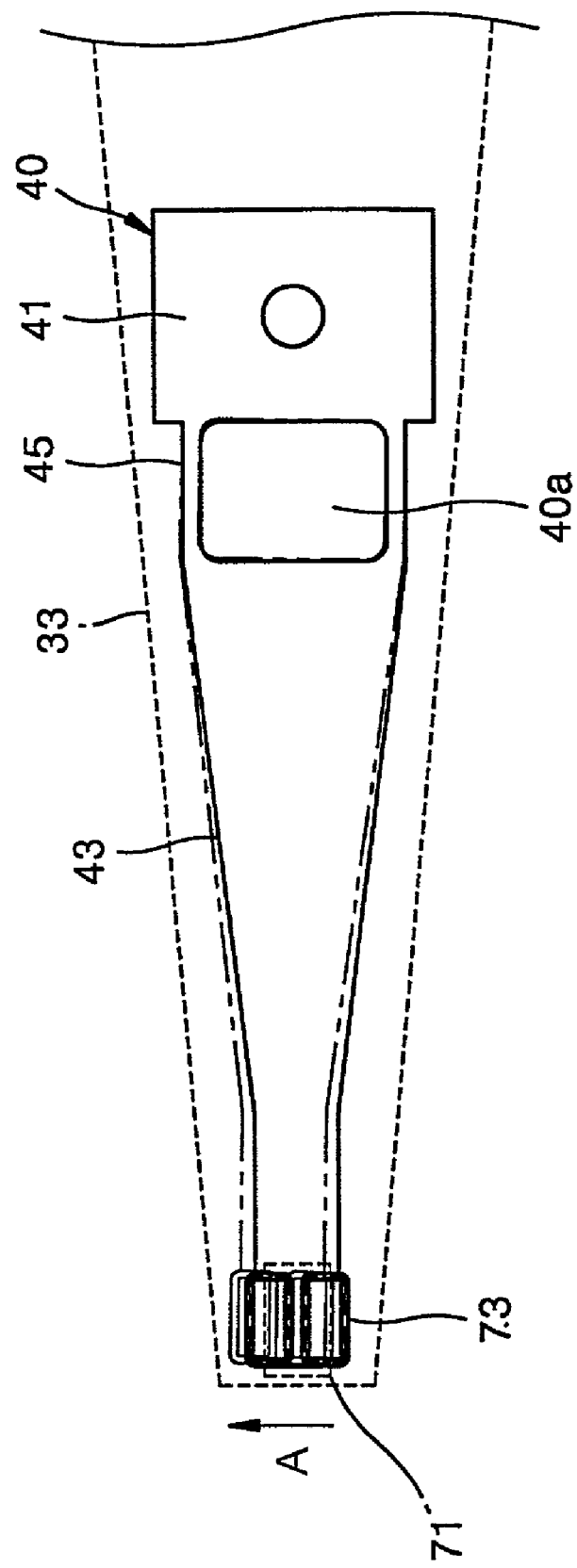
FIG. 5 is a schematic plan view showing a state in which the load beam of FIG. 4 is elastically deformed by electromagnetic force.

In the operation of the optical reading and writing system having the structure previously mentioned, as the optical disk 23 rotates at a high speed for recording and/or reproducing information, the slider 53 will begin to levitate over the recording surface by hydrodynamics exerted between the recording surface 23a and the slider 53, thereby creating a near field between the slider 53 and the recording surface 23a. Next, the voice coil motor 24 is driven to pivot the actuator arm 33 in the radial direction A. When the slider 53 is placed into a predetermined position on the optical disk 23, a predetermined amount of current is selectively applied to the coils 73 in a predetermined direction, thereby generating an electromagnetic force between the magnet 71 and the coils 73. As shown in FIG. 5, the hinged portion 45 of the load beam 40 deforms elastically in the radial direction A by the generated electromagnetic force, so that the free end 43 moves a small amount relative to the hinged portion 45 in the radial direction A. As a result, the slider 53 supported along with the flexure 50 by the free end 43 moves slightly in the radial direction A, independently from the pivot movement of the actuator arm 33, which enables accurate tracking, thereby enabling increased memory capacity of the optical disk 23.

In addition, because the coils 73 which provide a driving force to the free end 43 in the radial direction A are separated a predetermined distance apart from the hinged portion 45, such slight movement of the free end 43 is possible with a small driving force. Thus, the power required for the slight movement of the slider 53 can be reduced and desirable accurate tracking control can be achieved.

While the slider 53 is accurately tracking over the recording surface 23a, the light source 61 generates a light beam. The light beam emitted from the light source 61 is transferred to the optical path changing unit 63 through the optical fiber 69, and focused by the objective lens 65 to form a light spot on the recording surface 23a. Next, the light beam is reflected from the recording surface 23a and incident directly to the photodetector 67 through the objective lens 65 and the optical path changing unit 63. As previously mentioned, the photodetector 67 is aligned with the objective lens 65 and the optical path changing unit 63 in the vertical direction. The photodetector 67 receives the beam reflected from the recording surface 23a and detects information from the reflected beam. For the above operation, the optical source 61 and the optical path changing unit 63 are connected by the optical fiber 69, thereby minimizing optical loss that occurs during optical transmission through air. Also, the photodetector 67 is disposed closer to the recording surface 23a with reduced optical loss during the optical transmission toward the photodetector 67. Such reduction in optical loss improves the reliability in recording information on and reproducing information from the recording surface 23a.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. An optical reading and/or writing system used with an optical disk, comprising:
    an optical pickup including an objective lens, focusing a light beam to form a light spot on a recording surface of the optical disk;
    a voice coil motor;
    an actuator arm pivotable in a radial direction of the optical disk by the voice coil motor;
    a load beam supported by the actuator arm, and movable up and down and in the radial direction of the optical disk;
    a slider on which the objective lens is mounted;
    a flexure attached to the load beam, supporting the slider to move over the recording surface; and
    a driving unit mounted on free ends of the actuator arm and the load beam, providing a driving force in the radial direction to the free end of the load beam.

2. The optical reading and/or writing system of claim 1, wherein the load beam comprises:
    a fixed end fixed to the actuator arm;
    the free end extending from and flexible with respect to the fixed end; and
    a hinged portion between the fixed end and the free end, facilitating movement of the free end in the radial direction.

3. The optical reading and/or writing system of claim 2, wherein the hinged portion comprises a pair of slim portions spaced a predetermined distance apart from each other, the slim portions connecting facing edges of the fixed end and the free end.

4. The optical reading and/or writing system of claim 2, wherein the hinged portion is formed around a hole to connect facing edges of the fixed end and the free end.

5. The optical reading and/or writing system of claim 2, wherein the fixed end and the free end are connected through the hinged portion.

6. The optical reading and/or writing system of claim 1, wherein the driving unit comprises a magnet and a pair of coils, the magnet and the pair of coils being mounted on free ends of the actuator arm and the load beam, respectively, facing each other.

7. An optical reading and/or writing system used with an optical disk, comprising:
    a slider;
    an actuator assembly pivotable in a radial direction of the optical disk, supporting the slider to enable the slider to move over a recording surface of the optical disk; and
    an optical pickup focusing a light beam to form a light spot on the recording surface of the optical disk, the optical pickup comprising:
        a light source emitting the light beam,
        an optical oath changing unit arranged on an optical path between the light source and the recording surface, changing the traveling path of the incident beam,
        an objective lens mounted onto the slider, focusing the light beam from the optical path changing unit onto the recording surface,
        a photodetector receiving the light beam reflected from the recording surface and passed through the objective lens and the optical path changing unit, and
        at least one optical fiber connecting at least the light source and the optical path changing unit, transferring the emitted light beam to the optical path changing unit;
    wherein:
        an optical loss between the light source and the optical oath changing unit is suppressed;
        the actuator assembly comprises:
            an actuator arm pivotable in the radial direction of the optical disk by a voice coil motor,
            an elastically deformable load beam having one end fixed to the actuator arm, and
            a flexure attached to one side of the load beam;
        the optical path changing unit is disposed between the load beam and the actuator arm, facing the objective lens through first light passing apertures, respectively formed in the load beam and the flexure; and the photodetector is fitted into a second light passing aperture formed in the actuator arm to face the optical path changing unit and through the first light passing apertures.

8. The optical reading and/or writing system of claim 7, wherein the optical path changing unit is mounted on the load beam to face the actuator arm and to be enclosed by the second light passing aperture.

9. An optical reading and/or writing system used with an optical disk, comprising:
   a slider;
   an actuator assembly pivotable in a radial direction of the optical disk, supporting the slider to enable the slider to move over a recording surface of the optical disk; and
   an optical pickup focusing a light beam to form a light spot on the recording surface of the optical disk, the optical pickup comprising:
      a light source emitting the light beam,
      an optical path changing unit arranged on an optical path between the light source and the recording surface, changing the traveling path of the incident beam,
      an objective lens mounted onto the slider, focusing the light beam from the optical path changing unit onto the recording surface,
      a photodetector receiving the light beam reflected from the recording surface and passed through the objective lens and the optical oath changing unit, and
      at least one optical fiber connecting at least the light source and the optical path changing unit, transferring the emitted light beam to the optical path changing unit and suppressing an optical loss between the light source and the optical oath changing unit is suppressed,
   wherein the objective lens, the optical path changing unit and the photodetector are vertically aligned.

10. The optical reading and/or writing system of claim 7, further comprising;
   a base, wherein the actuator assembly further comprises a mounter supported against the base and has a recess receiving the light source, and the actuator arm has a hole for passing the optical fiber from one side to the other side thereof.

11. An optical system used with an optical disk, comprising:
   an actuator arm pivotable about an axis in a radial direction of the optical disk and having a free end distant from the pivot axis;
   a load beam supported by the actuator arm and having a free end movable in the radial direction relative to the movement of the actuator arm;
   a slide element having an objective lens and attached to the load beam, the slide element movable over a recording surface of the optical disk, the objective lens having a central axis, and
   a driving unit having first and second parts, the first part mounted at the free end of the actuator arm and the second part mounted at the free end of the load beam and interacting with the first part to provide a driving force to move the slide element in the radial direction relative to the actuator arm, wherein:
   the driving unit is more distant from the pivot axis than the central axis of the objective lens.

12. The optical system of claim 11, wherein the driving unit comprises:
   a magnet mounted on the free end of the actuator arm; and
   coils mounted on the free end of the load beam, interacting with the magnet to generate the drive force.

13. The optical system of claim 11, wherein the load beam comprises:
   a fixed end connected to the actuator arm; and
   an intermediate region, between the free end and the fixed end of the load beam, and flexible to enable the movement of the free end of the load beam in the radial direction relative to the actuator arm.

14. The optical system of claim 13, wherein the intermediate region comprises a pair of extensions separated by a gap from each other, connecting facing edges of the fixed end and the free end of the load beam.

15. The optical system of claim 11, wherein the load beam further comprises:
   a fixed end connected to a the actuator arm; and
   an intermediate region, disposed between the free and fixed ends of the load beam and closer to the fixed end of the load beam than to the free end of the load beam, the intermediate region flexible to enable the movement of the free end of the load beam in the radial direction relative to the actuator.

16. The optical system of claim 15, wherein the flexible intermediate region comprises a pair of extensions separated by a gap from each other, connecting facing edges of the fixed and free ends of the load beam.

17. The optical system of claim 11, further comprising:
   an optical pickup focusing a light beam onto the recording surface of the optical disk, comprising
      a light source mounted on the actuator arm, generating the light beam,
      a photodetector,
      an optical path changing unit directing the light beam from the light source toward the recording surface of the optical disk, and the light beam reflected from the recording surface of the optical disk toward the photodetector, and
      an optical fiber connecting the light source and the optical path changing unit, transferring the light beam from the light source to the optical path changing unit.

18. An optical system used with an optical disk, comprising:
   an actuator arm having first and second ends and pivotable in a radial direction of the optical disk about the second end of the actuator arm:
   a load beam supported by the actuator arm and having a first end movable in the radial direction relative to the movement of the actuator arm;
   a slide element having an objective lens and attached to the load beam, the slide element movable over a recording surface of the optical disk: and
   an optical pickup focusing a light beam onto the recording surface of the optical disk, the optical pickup comprising
      a light source mounted on the actuator arm, generating the light beam,
      a photodetector,
      an optical path changing unit directing the light beam from the light source toward the recording surface of the optical disk, and the light beam reflected from the recording surface of the optical disk toward the photodetector, and an optical fiber connecting the light source and the optical path changing unit, transferring the light beam from the light source to the optical path changing unit:

wherein:
the light source is mounted at a-the_second end of the actuator arm at a first side of the actuator arm facing away from the optical disk;
the optical path changing unit is disposed between the first ends of the load beam and the actuator arm at a second side of the actuator arm opposite the first side; and
the photodetector is in a second light passing aperture at the first side of the actuator arm; and
the actuator arm has a hole passing the optical fiber from the first side at the light source to the second side at the optical path changing unit of actuator arm.

19. The optical system of claim 18, wherein the objective lens, the optical path changing unit and the photodetector are aligned in a direction perpendicular to the recording surface of the optical disk.

20. An optical system used with an optical disk, comprising:
an actuator arm pivotable in a radial direction of the optical disk;
a load beam supported by the actuator arm and having a first end movable in the radial direction relative to the movement of the actuator arm;
a slide element having an objective lens and attached to the load beam, the slide element movable over a recording surface of the optical disk; and
an optical pickup focusing a light beam onto the recording surface of the optical disk, the optical pickup comprising
a light source mounted on the actuator arm, generating the light beam.
a photodetector,
an optical path changing unit directing the light beam from the light source toward the recording surface of the optical disk, and the light beam reflected from the recording surface of the optical disk toward the photodetector, and
an optical fiber connecting the light source and the optical path changing unit, transferring the light beam from the light source to the optical oath changing unit;
wherein the objective lens, the optical path changing unit and the photodetector are aligned in a direction perpendicular to the recording surface of the optical disk.

21. An optical system used with an optical disk, comprising:
an actuator arm pivotable in a radial direction of the optical disk;
a load beam supported by the actuator arm and having a first end movable in the radial direction relative to the movement of the actuator arm;
a slide element having an objective lens and attached to the load beam, the slide element movable over a recording surface of the optical disk; and
an optical pickup focusing a light beam onto the recording surface of the optical disk, the optical pickup comprising
a light source mounted on the actuator arm, generating the light beam,
a photodetector,
an optical path changing unit directing the light beam from the light source toward the recording surface of the optical disk, and the light beam reflected from the recording surface of the optical disk toward the photodetector, and
an optical fiber connecting the light source and the optical path changing unit, transferring the light beam from the light source to the optical path changing unit:
wherein the objective lens, the optical path changing unit and the photodetector are adjacent to each other at a first end of the sliding element, and the first end of the load beam and an end of the actuator arm.

22. An optical system used with an optical disk, comprising:
an actuator arm pivotable in a radial direction of the optical disk;
a load beam supported by the actuator arm and having a first end movable in the radial direction relative to the movement of the actuator arm;
a slide element having an objective lens and attached to the load beam, the slide element movable over a recording surface of the optical disk; and
an optical pickup focusing a light beam onto the recording surface of the optical disk, the optical pickup comprising:
a light source mounted on the actuator arm, generating the light beam,
a photodetector, and
an optical path changing unit directing the light beam from the light source toward the recording surface of the optical disk, and the light beam reflected from the recording surface of the optical disk toward the photodetector;
wherein the objective lens, the optical path changing unit and the photodetector are aligned in a direction perpendicular to the recording surface of the optical disk.

23. An optical system used with an optical disk, comprising:
an actuator arm pivotable in a radial direction of the optical disk;
a load beam supported by the actuator arm and having a first end movable in the radial direction relative to the movement of the actuator arm;
a slide element having an objective lens and attached to the load beam, the slide element movable over a recording surface of the optical disk; and
an optical pickup focusing a light beam onto the recording surface of the optical disk, the optical pickup comprising
a light source mounted on the actuator arm, generating the light beam,
a photodetector, and
an optical path changing unit directing the light beam from the light source toward the recording surface of the optical disk, and the light beam reflected from the recording surface of the optical disk toward the photodetector;
wherein the objective lens, the optical path changing unit and the photodetector are adjacent to each other at a first end of the sliding element, and the first end of the load beam and a first end of the actuator arm.

24. An optical system used with an optical disk, comprising:
an actuator arm assembly pivotable in a radial direction of the optical disk, and supporting a slider movable over a recording surface of the optical disk;
an optical pickup focusing a light beam onto the recording surface of the optical disk, comprising a light source mounted on the actuator arm assembly, generating the light beam, a photodetector mounted on the actuator arm assembly, an optical path changing unit mounted on the actuator arm assembly, directing the light beam from the light source toward the recording surface of the optical disk, and the light beam reflected from the recording surface of the optical disk toward the photodetector, and an objective lens mounted on the slider, focusing the light beam from the optical path changing unit to the recording surface of the optical disk;

wherein the objective lens, the optical path changing unit and the photodetector are aligned in a direction perpendicular to the recording surface of the optical disk.

25. The optical system of claim 24, wherein the actuator arm assembly comprises:

an actuator arm pivotable in the radial direction of the optical disk;

an elastically deformable load beam having one end fixed to the actuator arm and a flexure attached to one side of the load beam;

wherein the optical path changing unit is disposed between the load beam and the actuator arm, facing the objective lens through first light passing apertures respectively formed in a second end of the load beam and in the flexure; and wherein the photodetector faces the optical path changing unit and the objective lens through a second light passing aperture formed in an end of the actuator arm and aligned with the first light passing apertures.

26. The optical system of claim 25, wherein the photodetector is fitted in the second light passing aperture and the optical path changing unit is mounted on the load beam to face the actuator arm and is enclosed by the second light passing aperture.

27. An optical system used with an optical disk, comprising:

an actuator arm assembly pivotable in a radial direction of the optical disk, and supporting a slider movable over a recording surface of the optical disk, the actuator arm assembly having a Divot end and a free end;

an optical pickup focusing a light beam onto the recording surface of the optical disk, comprising:

a light source mounted on the actuator arm assembly, generating the light beam, a photodetector mounted on the actuator arm assembly, an optical path changing unit mounted on the actuator arm assembly, directing the light beam from the light source toward the recording surface of the optical disk, and the light beam reflected from the recording surface of the optical disk toward the photodetector, and an objective lens mounted on the slider, focusing the light beam from the optical path changing unit to the recording surface of the optical disk;

wherein the objective lens, the optical path changing unit and the photodetector are adjacent to each other at the free end of the actuator arm assembly.

28. The optical system of claim 27, wherein the actuator arm assembly comprises:

an actuator arm pivotable in the radial direction of the optical disk; and an elastically deformable load beam having one end fixed to the actuator arm and a flexure attached to one side of the load beam;

wherein the optical path changing unit is disposed between the load beam and the actuator arm, facing the objective lens through first light passing apertures respectively formed in a second end of the load beam and in the flexure; and wherein the photodetector faces the optical path changing unit and the objective lens through a second light passing aperture formed in an end of the actuator arm and aligned with the first light passing apertures.

29. The optical system of claim 28, wherein the photodetector is fitted in the second light passing aperture and the optical path changing unit is mounted on the load beam to face the actuator arm and is enclosed by the second light passing aperture.

* * * * *

UNITED STATES PATENT AND TRADEMARK OFFICE
CERTIFICATE OF CORRECTION

PATENT NO. : 7,079,455 B2 Page 1 of 1
APPLICATION NO. : 09/776706
DATED : July 18, 2006
INVENTOR(S) : Young-Min Cheong et al.

It is certified that error appears in the above-identified patent and that said Letters Patent is hereby corrected as shown below:

Column 6, line 40, change "oath" to -- path --

Column 6, line 56, change "oath" to -- path --

Column 7, line 28, change "oath" to -- path --

Column 7, line 33, change "oath" to -- path --

Column 8, line 17, delete "a"

Column 8, line 23, insert -- arm -- after "actuator"

Column 9, line 6, change "a-the_second" to -- the second --

Column 9, line 36, change "." to -- , --

Column 10, line 7, change " : " to -- ; --

Column 11, line 42, change "Divot" to -- pivot --

Signed and Sealed this

Second Day of January, 2007

JON W. DUDAS
*Director of the United States Patent and Trademark Office*